United States Patent
Benson et al.

(10) Patent No.: US 7,830,399 B2
(45) Date of Patent: Nov. 9, 2010

(54) SYSTEM AND METHOD FOR MANIPULATING DIGITAL IMAGES

(75) Inventors: Jeffrey Benson, San Francisco, CA (US); Chase Garfinkle, Redwood City, CA (US); Paul Haeberli, San Francisco, CA (US); Hwei Mien Quek, Cupertino, CA (US)

(73) Assignee: Shutterfly, Inc., Redwood City, CA (US)

( * ) Notice: Subject to any disclaimer, the term of this patent is extended or adjusted under 35 U.S.C. 154(b) by 0 days.

(21) Appl. No.: 12/500,461

(22) Filed: Jul. 9, 2009

(65) Prior Publication Data

US 2009/0285506 A1    Nov. 19, 2009

Related U.S. Application Data

(63) Continuation of application No. 09/679,948, filed on Oct. 4, 2000, now Pat. No. 7,576,752.

(51) Int. Cl.
G09G 5/00 (2006.01)
G06F 15/16 (2006.01)
G06K 9/32 (2006.01)

(52) U.S. Cl. .................. 345/619; 382/299; 709/203

(58) Field of Classification Search ................. 345/619
See application file for complete search history.

(56) References Cited

U.S. PATENT DOCUMENTS

| | | | | |
|---|---|---|---|---|
| 5,929,854 A | * | 7/1999 | Ross | 715/783 |
| 6,092,054 A | | 7/2000 | Tacjbary | |
| 6,448,956 B1 | * | 9/2002 | Berman et al. | 345/156 |
| 6,477,580 B1 | | 11/2002 | Bowman-Amuah | |
| 6,516,337 B1 | * | 2/2003 | Tripp et al. | 709/202 |
| 6,573,927 B2 | * | 6/2003 | Parulski et al. | 348/32 |
| 6,757,900 B1 | * | 6/2004 | Burd et al. | 719/316 |
| 6,779,153 B1 | * | 8/2004 | Kagle | 715/235 |
| 7,222,147 B1 | | 5/2007 | Black | |
| 2004/0133924 A1 | | 7/2004 | Wilkins | |

* cited by examiner

*Primary Examiner*—M Good Johnson
(74) *Attorney, Agent, or Firm*—Xin Wen

(57) ABSTRACT

A method for manipulating a digital image includes identifying an image for processing at a local client computer, sending the image to a remote server, manipulating either locally or remotely parameters associated with the image without modifying the image itself, capturing state information defining a state of the manipulations at a predefined time and selecting a previous state at the request of the user, and synchronizing the local client computer and the remote server including updating metadata for one of the local client computer and the remote server using metadata of the other.

25 Claims, 10 Drawing Sheets

SYSTEM AND METHOD FOR MANIPULATING DIGITAL IMAGES

CROSS-REFERENCES TO RELATED APPLICATIONS

The present application is a continuation of and claims priority to commonly assigned U.S. patent application Ser. No. 09/679,948, filed on Oct. 4, 2000 now U.S. Pat. No. 7,576,752, titled "System and method for manipulating digital images", the content of which is incorporated herein by reference.

TECHNICAL FIELD

This disclosure relates to a method and system for manipulating digital images.

BACKGROUND

Images can be generated in several ways. For example, an image can be captured using a film-based or digital camera and/or created and edited using image processing software such as ADOBE PHOTOSHOP® or the GNU IMAGE MANIPULATION PROGRAM ("GIMP"). Images captured using a film-based camera typically are stored as film negatives. Images captured using a digital camera typically are stored as digital files residing in the memory of the digital camera and/or a storage medium to which the file has been transferred (for example, a hard drive or CDROM). Images created using image processing software are typically stored as a digital file residing on a computer readable medium such as a hard drive.

An image-based product can be generated from such stored images. As used here, the term "image-based product" refers to an item, regardless of medium, that includes a visual representation of at least a portion of one or more images. One example of an image-based product is an image print (also commonly referred to as a "photograph"). For example, a user can take a picture using a conventional film-based camera and then bring the exposed film to a photofinishing laboratory to have the laboratory develop the exposed film and generate an image print.

When a customer wishes to have a high-quality image print generated from a digital image, the customer need not physically take the digital image to a photofinishing laboratory and instead can electronically transmit the digital image to an "online" photofinishing laboratory using a computer network such as the Internet. For example, the customer can use an Internet browser program (referred to herein as a "browser") such as NETSCAPE NAVIGATOR®, which is commercially available from Netscape Communications Corporation of Mountain View, Calif., USA. The customer can direct the browser to a web site associated with an online photofinishing service and upload the digital image to a server hosting the web site. The online photofinishing service can then take the digital image from the web server and produce a high-quality image print from the digital image in a conventional manner. The online photofinishing service then typically sends the high-quality image print to the customer using a delivery service such as the UNITED STATES POSTAL SERVICE or FEDERAL EXPRESS®.

A computer system can be used for executing software that allows a user to perform tasks such as communicating with other computer users, accessing various computer resources, and viewing, creating, or otherwise manipulating electronic content—that is, any combination of text, images, movies, music or other sounds, animations, 3D virtual worlds, and links to other objects. The system can include various input/output (I/O) devices (a mouse, a keyboard, a display) and a general purpose computer having a central processor unit (CPU), an I/O unit and a memory that stores data and various programs such as an operating system and one or more application programs. A computer system also typically includes non-volatile memory (e.g., flash RAM, a hard disk drive, and/or a floppy disk or other removable storage media) and a communications card or device (e.g., a modem or network adapter) for exchanging data with a network via a communications link (e.g., a telephone line).

The computer also can be connected to various peripheral I/O devices. One of the more popular of such peripheral devices is a digital camera that enables users to take pictures and save them in digital (electronic) format. The digital camera enables users to take pictures (i.e., images), which are saved in memory within the digital camera in a digital (electronic) format. The memory is typically in the form of a memory card, floppy disc or other storage means.

After taking and storing the images, the user can connect the appliance (e.g., digital camera) to a computer system in order to upload the digital images to the computer's disk drive or other non-volatile memory. Once the digital images are uploaded to the computer system, the user can erase the digital images from the memory of the digital camera so that the user can take and store additional images using the digital camera. Typically, the digital camera is connected to the computer system only while the user is uploading images to the computer's disk drive or other non-volatile memory.

Once the digital images are stored on the computer system, a user can perform various operations on them. For example, an image viewer application can be used to view the images or a photo editor application can be used to touch-up or otherwise modify the images. In addition, an electronic messaging (e.g., e-mail) application can be used to transmit the digital images to other users.

In addition to viewing the digital images on a computer display, users often desire to have hard copies (physical prints) made of digital images. Such hard copies can be generated locally using output devices such an inkjet printer, digital silver halide printer or a dye sublimation printer. In addition, users can transmit digital images (e.g., over a computer network) to a photofinishing service, which can make hard copies of the digital images and send them back to the user.

As described above, digital images can be uploaded to an online photofinishing service. However, the upload time can be substantial. That is, depending on the number and size of images, the amount of time required to transfer data to an online photofinishing service can reach un-wielding proportions. With the introduction of even higher resolution digital input devices such as 3 Mega-Pixel Digital Cameras, the amount of information transferred for a single image continues to increase. Most digital cameras offer few resolution settings, and as such consumers often default to select a very high resolution setting to ensure that the images captured can be developed to produce photo-realistic quality photographic prints. Unfortunately, the same advances in upload technologies have not been as forthcoming. Most conventional users still connect online with modem connections that have restrictions in the speed at which data can be uploaded. Today's conventional modems operate at 56 k bytes per second in the upload direction, requiring more than thirty seconds to load an image captured at a resolution of 1600×1200 (2 Mega-Pixel Resolution). While high speed modem connections such as digital subscriber lines (DSL) are substantially faster, the user unfortunately still faces significant upload times with large orders. In addition, the bandwidth for the system is completely tied up during these uploads, restricting the users ability to multitask and perform other operations.

From the perspective of the online photofinishing service, long connections are also not desirable. The longer that communications lines are tied to a single user, obviously, the fewer orders that can be received and processed. While the discussion above has focused on the amount of time required to upload image files to the online photofinishing service, other operations executed at the photofinishing server can exacerbate the problem. For example, many online photofinishing service providers offer editing and other image manipulation tools that the user can access after images are uploaded. As the user accesses or experiments with each of these tools, server (the online photofinishing service's hosting server) resources must be allocated to support these operations. In addition, each new product and service offered by the online photofinishing service adds to the resource drain. Server resources can become a bottleneck to processing orders.

From the user's prospective, while these tools and features are desirable, their appeal can be diminished if the amount of time the user is required to wait is excessive (as each tool executes and data is transferred from the remote photofinishing server to the user's local computer). The addition of new tools and features can significantly increase network traffic and computation load at the online photofinishing service's server.

The present inventors recognized that it would be advantageous to provide users with a way to quickly and efficiently order images from a photofinishing service without unnecessarily tying up an online photofinishing service's server resources. What is desired is a system for providing all the tools and features of an online photofinishing service directly to the user without tying up the server's resources. In addition, the system should allow that one or more orders can be printed and/or distributed to multiple recipients while minimizing the user's time, effort, and expense in providing the image files to the photofinishing service.

SUMMARY

In one general aspect, the present application relates to a method for manipulating a digital image. The method includes identifying an image associated with a user on a local client computer; defining a personal template that describes a specific configuration of one or more parameters that describe manipulations to be applied to at least one image associated with the same user; sending the image from the local client computer to a remote server; storing the personal template in association with the image on the local client computer and the remote server; modifying one or more parameters in the personal template, by a computer processor in the local client computer or a remote processor in communication with the remote server, without manipulating the image itself, and synchronizing the personal templates on the local client computer and the remote server.

In another general aspect, the present application relates to a method for manipulating a digital image. The method includes identifying an image for processing at a local client computer, sending the image to a remote server, manipulating either locally or remotely parameters associated with the image without modifying the image itself, synchronizing the local client computer and the remote server including updating metadata for one of the local client computer and the remote server using metadata of the other, checking for conflicts between metadata stored at the local client computer and the remote server, and storing two different states of the metadata at each of the local client computer and the remote server, one for each of the conflicting parameters.

In another general aspect, the present application relates to a method for manipulating a digital image. The method includes identifying an image for processing at a local client computer, sending the image to a remote server, manipulating either locally or remotely parameters associated with the image without modifying the image itself, capturing state information defining a state of the manipulations at a predefined time and selecting a previous state at the request of the user, and synchronizing the local client computer and the remote server including updating metadata for one of the local client computer and the remote server using metadata of the other.

Implementations of the system may include one or more of the following. The one or more parameters can include an identifier for the personal template. The step of synchronizing can include checking for conflicts between the personal templates stored on the local client computer and the remote server; and upon detecting a conflict, alerting the user to the conflict. The method can further include receiving, from the user, a selection regarding adopting one of the personal templates stored on the local client computer and the remote sever; and synchronizing the personal templates stored on the local client computer and the remote sever according to selection. The method can further include storing two different states of the personal templates at each of the local client computer and the remote server, one state containing a different set of conflicting parameters. The method can further include manipulating a proxy image that is a lower resolution version of the image in accordance to the one or more modified parameters in the personal template; and displaying the manipulated proxy image. The one or more parameters can include annotation to be inserted in the image. The method can further include inserting the annotation to a proxy image that is a lower resolution version of the image; and displaying the proxy image containing the annotation. The method can further include capturing a history of states of the one or more parameters; and selecting one of the history of states without traversing back through each intermediary state in the history. The local client computer can be selected from the group consisting of a portable digital assistant, a portable computer, a kiosk, a digital camera, and a docking station. The one or more parameters can include print parameters for printing an image-based product incorporating the image. The print parameters can include print calibration parameters for the printer. The print parameters can include information to be printed on the back of an image print based on the image.

Advantages that can be seen in implementations of the invention include one or more of the following. A system is provided that allows for integrated remote (Web-based) and local image processing. The system reduces network traffic and computation load at an online photofinishing service's server. The system allows the user to integrate image management on the local computer and image archival and printing service at the website of an online photofinisher.

Client based editing and manipulation software is provided that is downloadable and upgradeable from the online photofinisher's website. Image processing can be made on a proxy image. The proxy image is typically of lower resolution than the original image for faster processing speed. The system saves processing parameters in a metadata file while the source image is not changed. The processing parameters can be sent to the server of the online photofinisher where the source image is processed using the processing parameter saved in the metadata file, for viewing or printing. Examples of processing parameters are rotation and cropping parameters. The system can allow the user also to choose to use the source image for image processing rather than operating on a proxy image.

The proposed client-based software tracks the processing changes by the user on each particular image. The software also offers an incremental undo function so that the user can change back to a previous image state if he/she decides to try something different. The history of the image processing and undo functions is stored and synchronized between the client computer and online server so that it can be used analogously on both the web (e.g., the server) and the client computer.

Personal templates can be saved that define a particular set or chain of image processing operations often used by a user. The metadata file can also include the states (i.e. the user interface (UI) settings) of the UI at the time the image operations are invoked by the user. Unique UI state information can be associated with each image. The UI states can be transferred from the client to the server along with the source image. If the source image is already stored in the user account on the server, only the metadata file needs to be transferred to the server and updated in the user account. The preservation and storing of the UI states allows the user to recover the exact display condition he/she created on a different client computer or on the website.

The order/pricing, verification and other information provided to the online photofinisher can all be input on the user's computer.

Each time a connection to the user's account at the online photofinisher's website is made, the state information of the user account is updated on the user computer and on the web. The state information can include image transfers or upload, the transfer of an image file name, image processing information, image archival information, annotation and back printing information, UI state information, personal template, and order information. The input information on the user's computer can be automatically uploaded to the user account on the web.

The user can view his/her last updated user account information on the user's local computer. The synchronization is a bidirectional process. The system updates the client computer or the user account on the web based on the last changes made on either a computer or the website. A dialog can be prompted if conflicts occur as a result of proposed changes to identical image properties. In this case, the user can choose one of the settings or save both settings under different names.

The system allows for distributed image editing, reviewing, and correction.

A printer output profile of the printer at the online photofinisher's site can be incorporated as part of the system software. This output profile helps to simulate the effect of an image printed on the online photofinisher's printer. Different output profiles can be provided for different receivers such as poster print, glossy substrate, canvas, fabric, or for different printing technologies such as digital silver halide, ink jet, laser, thermal and dye sublimation.

The system can help the user organize his images in an image metaphor very similar to what he/she views online at the online photofinisher's website. The images can be viewed in thumbnail sizes in an array structure. Alternatively, a proxy representation of the images can be generated that is of a higher or lower quality than a conventional thumbnail image. For example, the proxy representation can be generated that is of sufficient quality for printing on the client computer. They can be dragged and dropped into a box that represents the user account at the online photofinisher website. Each image carries information about the use, share, print, and archival history of that particular image stored on the website. The system can produce an album, slide show, and categories (folders) of the images on the client computer. The system can organize the user's images that are stored in the client computer or only stored on the photofinisher's website. For the digital images that are only stored on the photofinisher's website, thumbnail images of the images are created in the synchronization process so that the images can be represented on the client computer.

The client-based software can offer tools for educating the user about imaging sciences and technologies. For example, an image quality barometer is provided for the user to visualize the image quality level of a digital image with a certain number of image pixels (1M, 2M, 3M pixels), and the images printed at certain dimensions (3.5", 4", 5', 8" etc.).

The details of one or more implementations of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
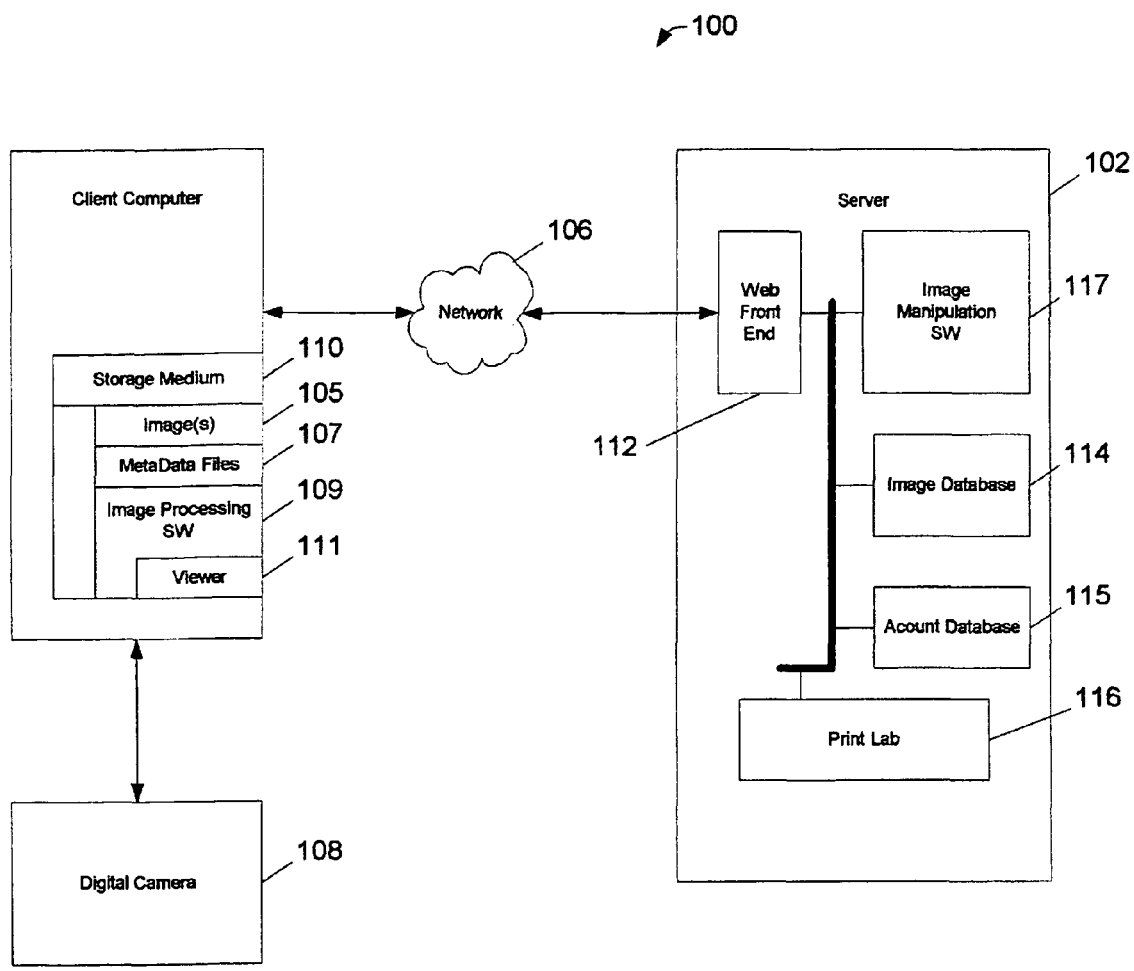
FIG. 1 is a block diagram of a system for generating image-based products from digital images.

One implementation of a system 100 for generating image-based products from digital images is shown in FIG. 1. System 100 includes a server 102 that is connected to one or more client computers 104 by a network 106 such as the Internet. The client computers 104 can be connected to a digital camera 108 so that a user can upload captured digital images from the digital camera 108 to the client computer 104. Client computer 104 can execute image processing software 109 in order to manipulate and/or edit digital images. The client computer 104 includes a storage medium 110 such as a hard disk for storing the digital images and other data (e.g., metadata as described below). The client computer 104 can be implemented using a variety of hardware and software. For example, the client computer 104 can be a general-purpose device such as a personal computer, portable computer, or portable digital assistant ("PDA") or as a special-purpose device such as a point-of-sale kiosk having an embedded computer. As used herein, "client computer" refers to a personal computer such as IBM PB, Macintosh, or information appliances such as a handheld device, WebTV, a cell phone, a Game Boy, a digital camera, or an imaging kiosk. For each user and an online photofinisher, there can be a plurality of client computers.

The client computer can also be a fax machine. The user can submit orders by sending a fax to the online photofinisher. The fax sheet can be produced specifically for a given user. For example, a barcode carrying the user account information can be printed on the sheet. Check boxes can be provided for easy ordering. Upon receipt, the photofinshing service can use automatic scanning techniques to promptly bring up the user account information for processing the order.

The client computer 104 is connected to the network 106, for example, using a modem, network interface card or wireless connection. The system 100 can be implemented as a browser-based system in accordance with the standard protocols for communicating over the Word Wide Web. In such an implementation, a user of the client computer 104 can execute a browser to connect to and interact with the server 102. The server 102 includes a web front end 112 that manages the communications with the client computer 104. The user of the client computer 104 can upload digital images and other information to the server 102. The web front end 112 receives the uploaded digital images and other information and stores each in an image database 114 and account database 115, respectively.

The user of the client computer 104 can also order image prints made from selected images. The server 102 includes, or is connected to, a print lab 116. The print lab 116 receives the selected images from the server 102 and generates image prints from the selected images. The print lab 116 can generate other image-based products. For example, the print lab 116 can frame image prints in one or more frames selected by the user and/or print or otherwise embody the selected images in other items such as clothing, buttons, mugs, cards, invitations, and calendars. The items generated by the print lab 116 can be shipped to the user using a conventional shipping service such as the UNITED STATES POSTAL SERVICE or FEDERAL EXPRESS®. Commonly assigned co-pending U.S. patent applications Nos. 09/428,871 (entitled "MULTI-TIERED IMAGE DATABASE" and filed Oct. 27, 1999), 09/436,704 (entitled "DISTRIBUTING IMAGES TO MULTIPLE RECIPIENTS" and filed Nov. 9, 1999), and 09/450,075 (entitled "PRINTING IMAGES IN AN OPTIMIZED MANNER" and filed Nov. 29, 1999), all of which are incorporated herein by reference, disclose various approaches to implementing a system 100 for generating image-based products from digital images.

Figure 2:
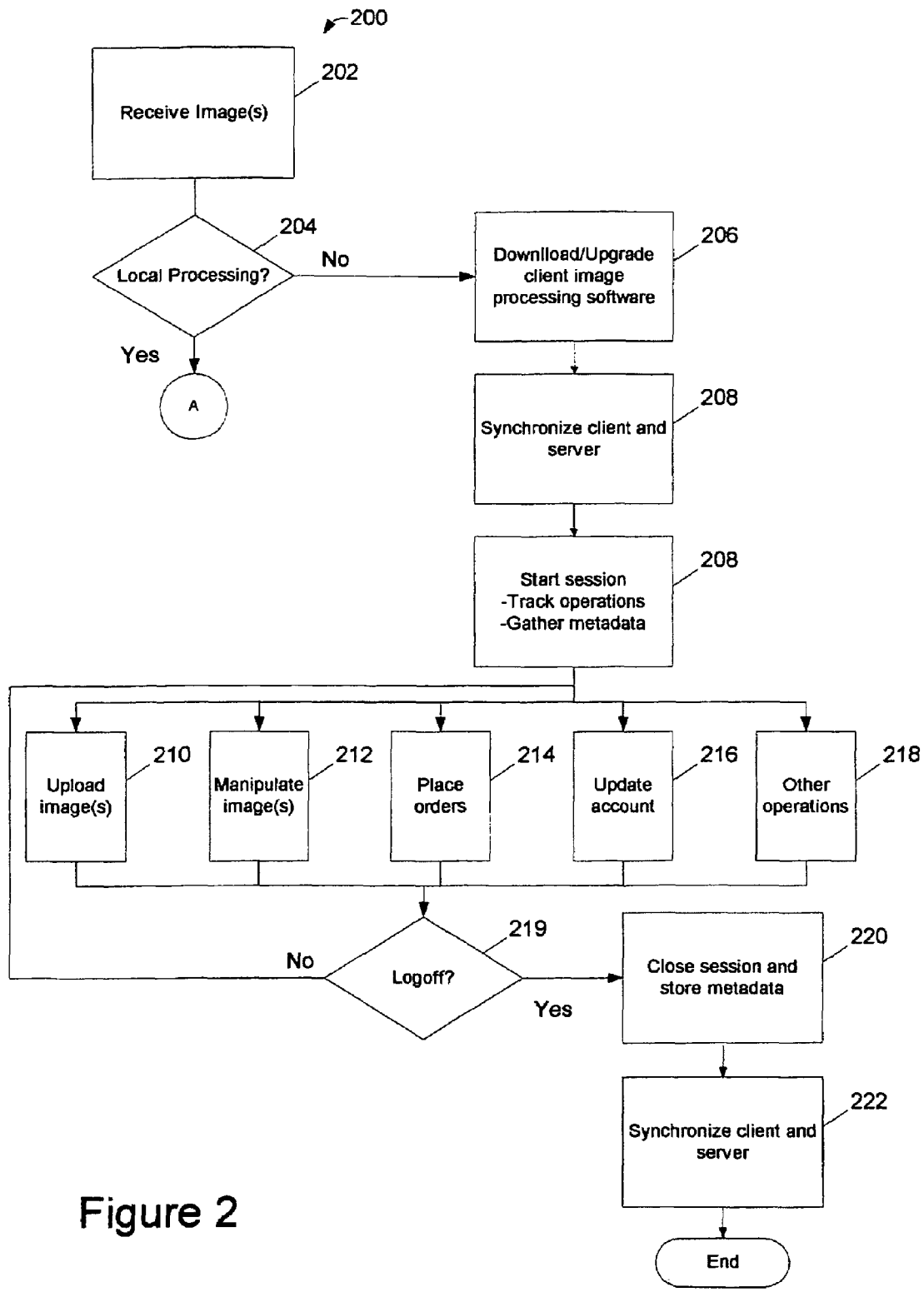
FIG. 2 is a flow diagram of a process for offering image-based products for sale over a computer network.
Figure 2:
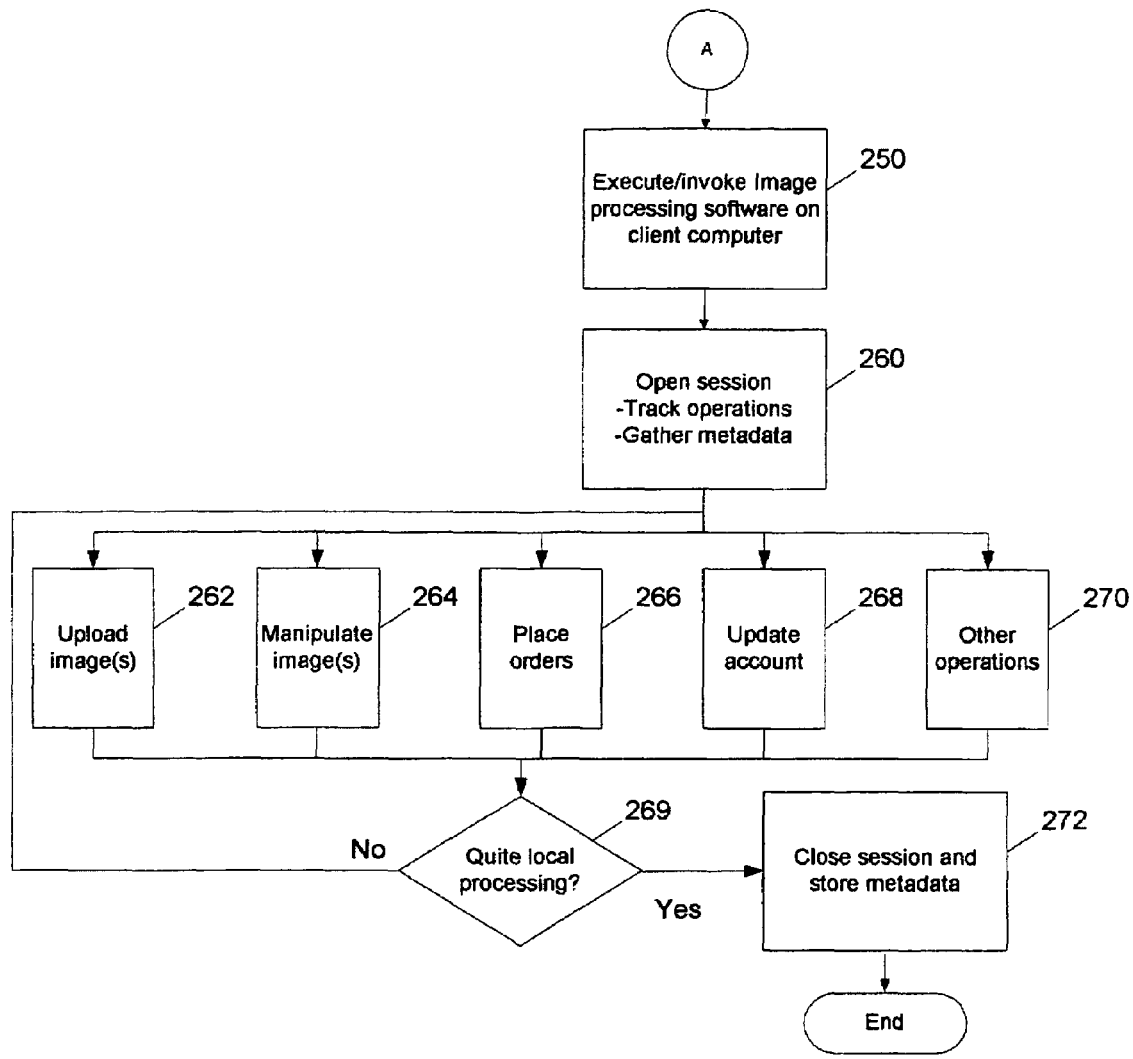

Referring now to FIGS. 1 and 2, a flow diagram of a high-level process 200 for manipulating images over a computer network such as the Internet (e.g., using system 100 shown in FIG. 1) is shown. First, an image is received at the client computer 104 (202). For example, a user can manipulate a digital camera, take one or more pictures, then upload the pictures to the client computer 104. Thereafter, the user can select from local or remote processing (204).

If remote processing is selected, then the user can download or upgrade the image processing software 109 as appropriate (206). Client image processing software 109 can be downloaded to allow the user to locally perform most image manipulations and other operations traditionally executed at the online photofinisher's server 102. In one implementation, upgrades can automatically be downloaded at each logon to the server 102. Alternatively, the user can be prompted to either download or upgrade the image processing software.

Thereafter, the user can perform one of a plurality of image and account manipulations as desired by executing the image manipulation software 117. Each of the individual processes is discussed in greater detail below. First, the local client computer 104 and server 102 are synchronized for the current user (208). Typically, the first synchronization is used to update the server 102 with information developed as a result of local processing by the user on the client computer 104. However, the synchronization can be two-way, that is, the server 104 can also update the client computer 102. For example, the user may have last updated his/her account using a different client device and as such the server 102 may contain the most current account information. In either case, a synchronization between the two devices is performed. In one implementation, any conflicts that arise can prompt the generation of a dialog box on the user interface (UI) of the client computer 104, prompting the user to decide how to best synchronize the two devices. Alternatively, the synchronization process may save merged variations of the local and remote information (e.g., there are no conflicts, all data is saved and the user may choose the correct current state) Synchronization processes are described in greater detail below.

After synchronizing, a session is started in which user operations are tracked and metadata describing such operations is created (210). The metadata is recorded for later synchronization with the client computer 104. Thereafter, the user can optionally upload images (210), manipulate images (212), place orders (214), update account information (216) or execute other operations (218) as desired.

When a user is ready to logoff from the remote site (server 102) (219), the session is closed and metadata gathered through the tracking operation (step 210) is stored locally on the server 102 (220). Finally, the client computer 104 and the server 102 are once again synchronized including the exchange of the metadata gathered by the server 102 (222). The second synchronization is used to update the client computer 104 with information developed as a result of the online processing operations executed at server 102. After the second synchronization, the process ends with control returning to the client computer. In one implementation, the second synchronization may not be performed. For example, if the session ends unexpectedly or otherwise is unable to be completed, synchronization between the client computer 104 and the server 102 may be performed at a next login.

If local processing is selected, then the client computer 104 executes image processing software 109 in order to manipulate and/or edit digital images (250). Thereafter, the user can perform one of a plurality of image and account manipulations as desired. First, a session is started in which user operations are tracked and metadata describing such operations is created (260). The metadata is recorded for later synchronization with the server 102. Thereafter, the user can optionally upload images (262), manipulate images (264), place orders (266), update account information (268) or execute other operations (270) as desired.

When a user is ready to quit the local processing (271), the session is closed and metadata gathered through the tracking operation (step 260) is stored locally on the client computer 104 in storage medium 110 (272). After the metadata is stored, program execution is halted with control returning to the client computer.

Synchronization (Process Steps 208 and 222)

Synchronization is performed between the client computer 104 and server computer 102 to ensure a seamless experience for the user. No matter where data is manipulated, whether account, order or image data, either locally or remotely, a synchronization process is executed to allow both remote and local processes to be current.

As described above, synchronization occurs each time a connection to the user's account at the online photofinisher's website is made. State information of the user account is updated on the user computer and on the web. The state information can include image transfers or upload, the transfer of the image file name, image processing information, image archival information, annotation and back printing information, UI state information, personal template, order information. In one implementation, any input information on the user's computer will be automatically uploaded to the user account on the web without requiring the user to log onto the website.

By providing synchronization between the local client computer 104 and the remote server 102, the user will always be able to view his/her last updated user account. As described above, the synchronization can be a bidirectional process. Image processing software 109 can include tools for maintaining state information on the local client computer 104. Similarly, server 102 can include tools for maintaining state information when the user is logged into the photofinisher's website. Each of the tools can be used to update a respective corresponding client computer/server. A dialog can be prompted if conflicts occur as a result of parallel changes on the identical account or image data. In this case, the user can choose one of the settings or save both settings under different names.

Client and server based image processing software (i.e., image processing software 109 and image manipulation software 117) track the processing changes by the user on each particular image. Each offer incremental undo functions so that the user can change back to a previous image state if he/she decides to try something different. The history of the image processing and undo functions is stored and synchronized between the client computer 104 and the server 102 so that it can be used analogously on both the web and the client computer. [Would this be an appropriate place to discuss view and source IDs and the data structure associated with saving state information in this form?]

The metadata file can also include the state information (e.g. the UI settings) of the user interface (UI) at the time of image operations by the user. The UI states can be transferred from the client to the server along with the source image as part of the state information. If the source image is already stored in the user account on the server 102, only the metadata file (i.e., state information) needs to be transferred to the server and updated in the user account. The preservation and storing of the UI states allows the user to recover the exact display condition he/she created on a different client computer or on the website. For example, the user may want to share a particular viewing condition of an image with his friend or family member, which can be enabled by the UI states sent along with the image in a tag file.

In one implementation, when implemented on a Apple MAC, the MAC user state information may be included in the metadata file.

Upload

One or more images can be directly uploaded to the server 102 from the client computer 104. The process for uploading images can include executing a browser on the client computer 104 that can access the web front end 112 of the server 102 to enable the upload a digital image to the server 102. The server 102 receives the uploaded image, which the user can select for subsequent processing as described below. Also, the uploaded image can be stored in the image database 114.

Manipulation i) Remote Manipulation

Figure 3:
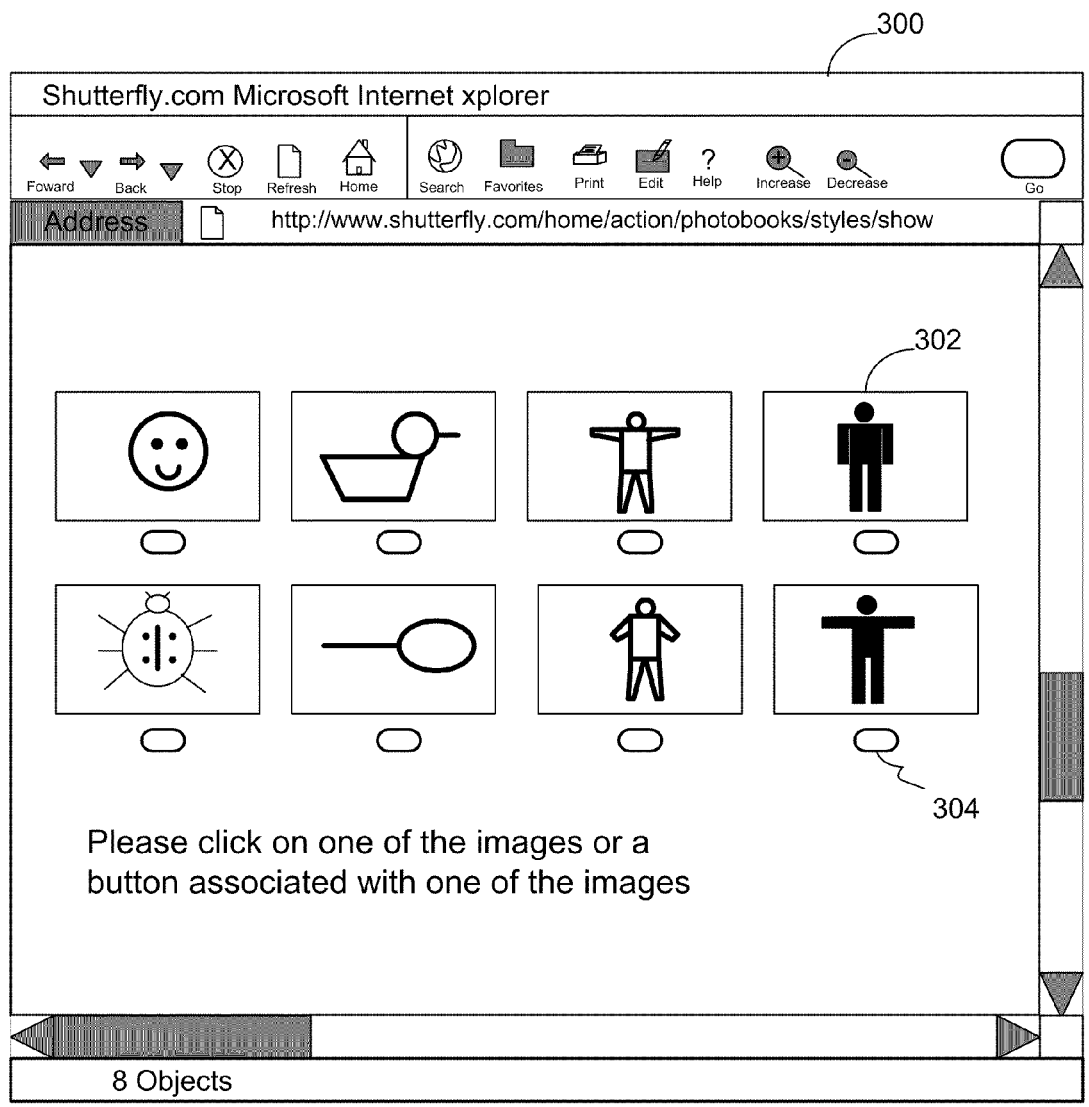
FIG. 3 illustrates a user interface that can be used to select an image for further processing.

After logging in to server 102, the user can manipulate account, order and image data using image manipulation software 117. For example, an image is retrieved from the image database 114. The web front end 112 allows the user to view images stored in the image database 114 on the client computer 104 and select an image for subsequent processing. FIG. 3 shows one example of a user interface 300 that is used to allow a user to select an image for subsequent processing. A plurality of "thumbnail" (or proxy) versions 302 of images stored in the image database 114 (also referred to here as "thumbnails") are displayed in the user interface 300. The user interface 300 is configured in a conventional manner so that a user can select a particular image by clicking on the thumbnail 302 associated with that image. In addition, or instead, the user interface 300 includes a plurality of buttons 304 (or other user interface controls) associated with one or more images stored in the image database 114; a user can click on (or otherwise actuate) one of the buttons 304 in order to select the one or more images associated with that button 304. The selected image is then retrieved from the image database 114 and used for subsequent processing. The image can be received and selected in other ways, including for example, as an attachment to an email or embodied on a storage medium such as photograph, a flash memory card or CD-ROM.

Then, one or more preview images for an image based product incorporating the selected image can be displayed (block 212 shown in FIG. 2). As noted above, an image-based product is an item, regardless of medium, that includes a visual representation of at least a portion of one or more images. Examples of image-based products include image prints, buttons, posters, mugs, clothing, and cards in which at least a portion of one or more images is printed or otherwise incorporated or embodied. A preview image is a visual representation of an image-based product incorporating the selected image. The preview image is displayed in order to give the user an idea of what an image-based product incorporating the selected image will look like.

In addition, the user can process and order for an image-based product incorporating the selected image (block 214 of FIG. 2). For example, the order can be received by the web front end 112 from the user's client computer 104. The order can be received in other ways including, for example, via electronic mail, Internet Relay Chat, the telephone, and/or the mail. Typically, the order will include information specifying (or otherwise referring or pointing to) a type of image-based product, the image to incorporate into the image-based product, a quantity of the image-based product being ordered, payment information, and delivery information. After the order has been received, the order can be fulfilled. For example, the order can be fulfilled by printing or otherwise generating the image-based product and delivering the product to the customer.

Figure 4:
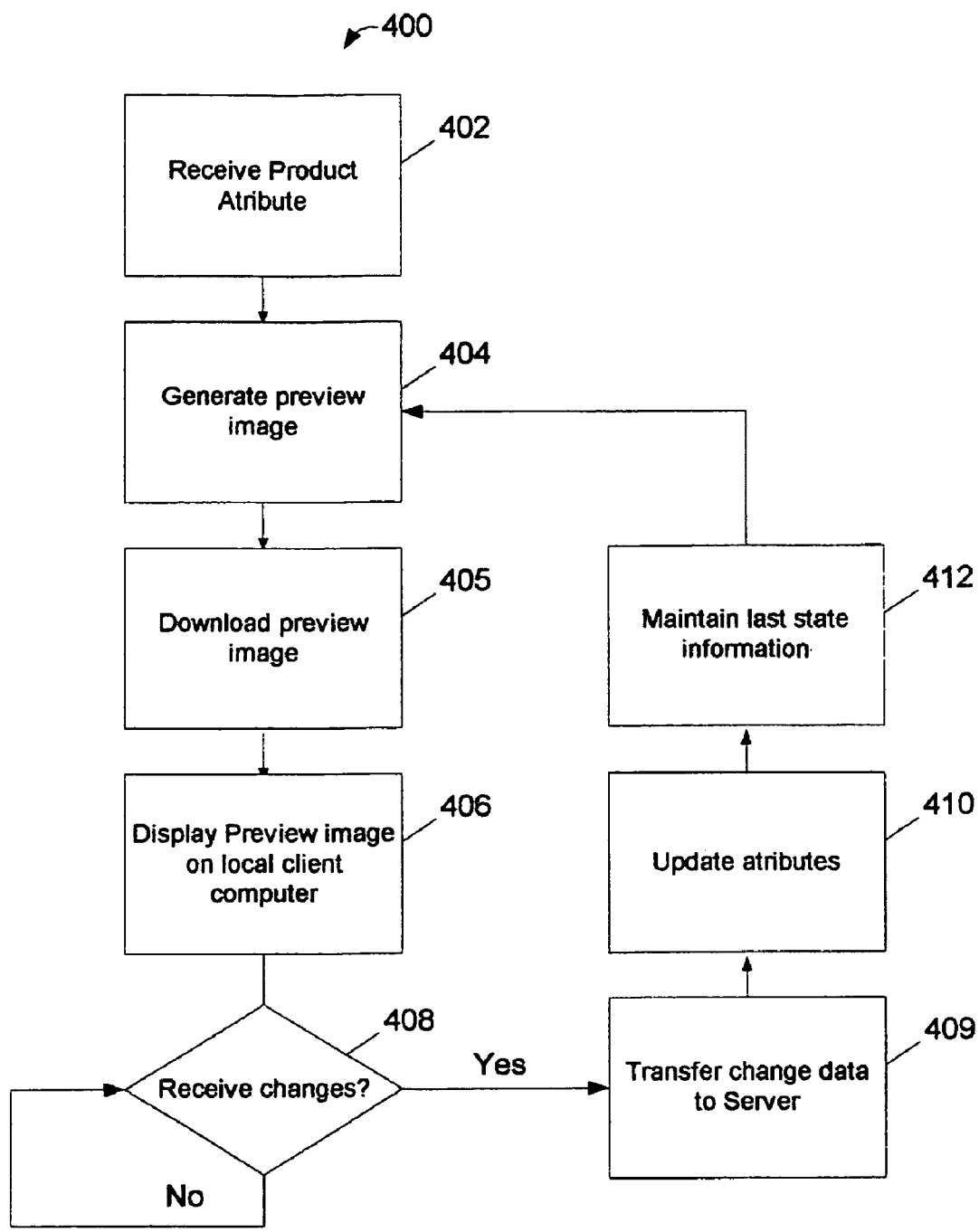
FIG. 4 is a flow diagram of a process for displaying preview images of an image-based product using server resources.

FIG. 4 is a flow diagram of a high-level process 400 of displaying preview images of an image-based product. A set of attributes for the image-based product (also referred to here as "product attributes") is received (block 402). In the case of an image print, the product attributes can include, for example, the size of the image print, the number and identity of the images included in the image print, cropping information, and the size, style, and color of any border surrounding the image portion of the image print. The set of attributes can be received from the user, for example, by having the user enter or select attributes using a browser executing on the client computer 104 or as part of state information provided by the client computer 104 in a synchronization process. Also, the set of attributes can be retrieved from storage, for example, from a database, or otherwise provided.

Thereafter, a preview image can generated using the current set of product attributes for that image-based product (block 404). In the case of an image print, a preview image can be generated that shows an image print incorporating the portions of the images specified in the product attributes. The preview image can show any other feature specified in the product attributes. For example, the preview image can be scaled to the specified image print size and include the specified border size and style. Thereafter, the preview image is downloaded to the client computer (block 405). The preview image is then displayed (block 406). For example, the preview image can be generated by the web front end 112 and downloaded to, and displayed on, the client computer 104.

Next, any changes to the product attributes can be received (408). After viewing the displayed preview image, the user may wish to change one or more of the product attributes. In one implementation, the user can makes such changes to the product attributes using a browser executing on the client computer 104. The changes can then be transmitted to the web front end 112 (409), which updates the product attributes for the currently displayed image-based product (410) while maintaining the last state information (412). Process 400 then loops back to block 404 and generates and displays a new preview image and receives any further changes to the product attributes.

In one implementation, one type of change (step 408) is an undo change. The image manipulation software 117 can include an undo tool to allow a user to undo previous operations or manipulations that form the current product attributes. In one implementation, the user can invoke the undo tool to reset the product attributes to a last defined state. Alternatively, the user can select from a list of previous states to return to. In another implementation, the undo tool only "un-does" the last operation/change to the product attributes. In another implementation, the undo tool can be used to specify a change to a known state. In one implementation, the undo tool operates on the product attribute information and not on the image data. In this way, the original image data can always be recalled as necessary.

ii) Local Manipulation

After selecting local processing (block 204 of FIG. 2), the user can manipulate account, order and image data using image processing software 109. For example, an image can be retrieved from the storage medium 110. The image processing software can be invoked and includes a viewer 111 to allow the user to view images stored in the storage medium 110 or downloaded from the server 102, and select an image for subsequent processing. A user interface that is identical to the UI presented by the server 102 can be presented by image processing software 109 to make the user experience at both the server 102 and the client computer 104 seamless. In one implementation, the user interface that can be used to allow a user to select an image for subsequent processing is the same as that shown in FIG. 3. A plurality of "thumbnail" (or proxy) versions of images stored in the storage medium 110 (also referred to here as "thumbnails") are displayed in the user interface. The user interface can again be configured in a conventional manner so that a user can select a particular image by clicking on the thumbnail associated with that image. In addition, or instead, the user interface can include a plurality of buttons (or other user interface controls) associated with one or more images stored in the storage medium 110. A user can click on (or otherwise actuate) one of the buttons in order to select the one or more images associated with that button. The selected image is then retrieved from the storage medium 110 or the server 102 and used for subsequent processing. In one implementation, rather than retrieve the original image from server 102, a lower resolution proxy image can be retrieved. Proxy images are discussed in greater detail below.

The image can be received and selected in other ways, including for example, as an attachment to an email or embodied on a storage medium such as photograph, a flash memory card or CD-ROM.

One or more preview images for an image based product incorporating the selected image can be displayed. As noted above, an image-based product is an item, regardless of medium, that includes a visual representation of at least a portion of one or more images. Examples of image-based products include image prints, buttons, posters, mugs, clothing, and cards in which at least a portion of one or more images is printed or otherwise incorporated or embodied. A preview image is a visual representation of an image-based product incorporating the selected image. The preview image is displayed in order to give the user an idea of what an image-based product incorporating the selected image will look like.

In addition, the user can process an order for an image-based product incorporating the selected image. For example, the order can be placed on the client computer 104 and subsequently transferred to the server 102. The order can be received in other ways including, for example, via electronic mail, Internet Relay Chat, the telephone, and/or the mail. Typically, the order will include information specifying (or otherwise referring or pointing to) a type of image-based product, the image to incorporate into the image-based product, a quantity of the image-based product being ordered, payment information, and delivery information. After the order has been received, the order can be fulfilled. For example, the order can be fulfilled by printing or otherwise generating the image-based product and delivering the product to the customer.

Figure 5:
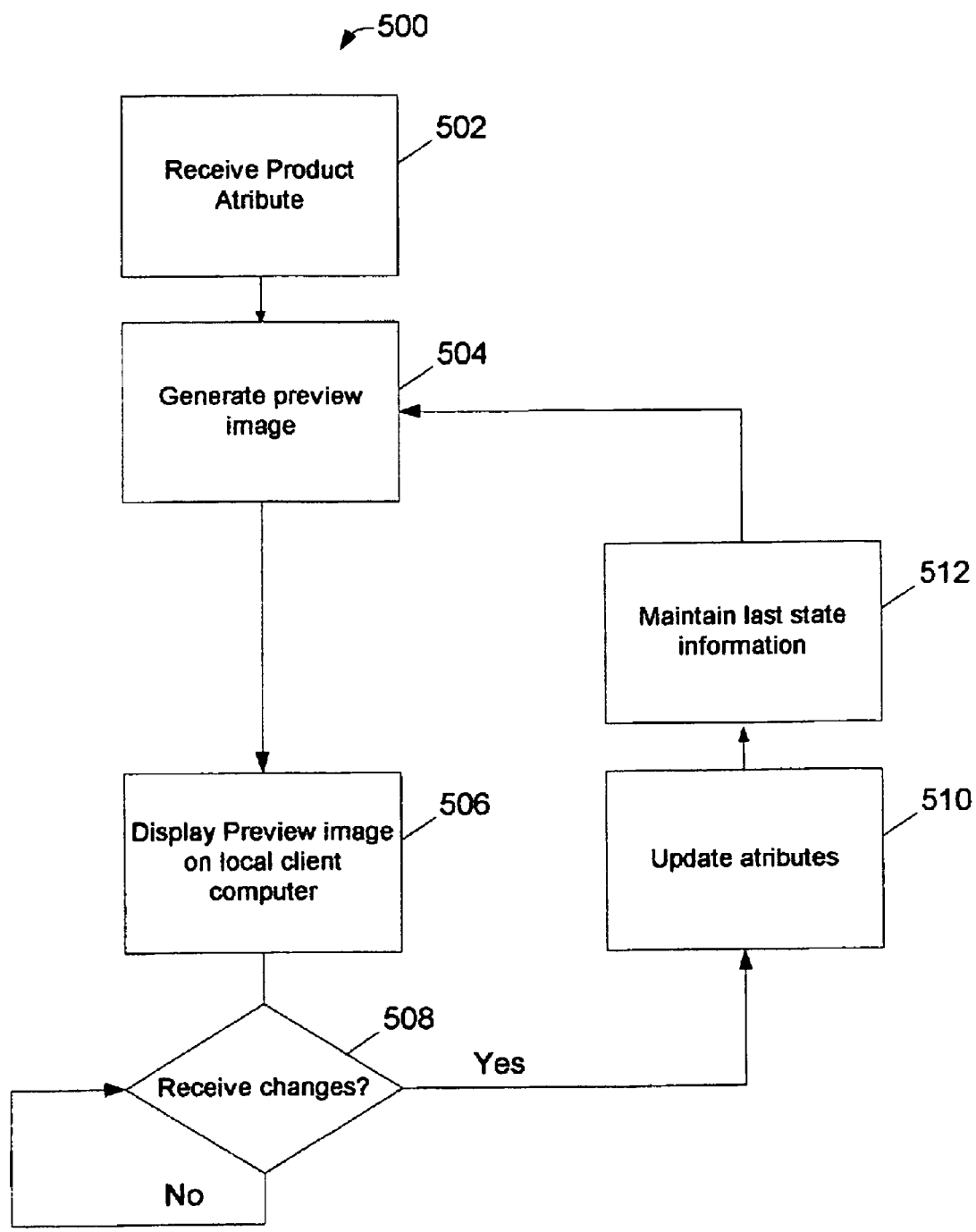
FIG. 5 is a flow diagram of a process for displaying preview images of an image-based product using client computer resources.

FIG. 5 is a flow diagram of a high-level process 500 of displaying preview images of an image-based product on a client computer. A set of attributes for the image-based product (also referred to here as "product attributes") is received (block 502). In the case of an image print, the product attributes can include, for example, the size of the image print, the number and identity of the images included in the image print, cropping information, and the size, style, and color of any border surrounding the image portion of the image print. The set of attributes can be received from the user, for example, by having the user enter or select attributes using an application (i.e., image processing software 109) executing on the client computer 104 or as part of state information provided by the server 104 in a synchronization process or as part of state information that is retrieved from storage medium 110 (produced by the user when manipulating images on the client computer 104). Also, the set of attributes can be retrieved from storage, for example, from a database, or otherwise provided.

Thereafter, a preview image can be generated using the current set of product attributes for that image-based product (block 504). In the case of an image print, a preview image can be generated that shows an image print incorporating the portions of the images specified in the product attributes. The preview image can show any other feature specified in the product attributes. For example, the preview image can be scaled to the specified image print size and include the specified border size and style. In addition, the product attributes can contain display calibration or printer calibration data so that the local user experience provides a better representation of the final output produced by the server fulfillment system.

The preview image is then displayed (block 506). For example, the preview image can be generated by the image processing software 109 and displayed on the client computer 104. Next, any changes to the product attributes can be received (508). After viewing the displayed preview image, the user may wish to change one or more of the product attributes or undo a previous operation. Change information is stored as the current product attributes (510) while previous state information is stored (512) to allow for a rollback to the previous state. In one implementation, the user can makes such changes to the product attributes using the image processing software 109 executing on the client computer 104. Process 500 then loops back to block 504 and generates and displays (locally) a new preview image and receives any further changes to the product attributes. The local processing described herein is faster than the remote processing operations described with regard to FIG. 4 because the upload and download operations between the client computer and the server have been eliminated, dramatically increasing user satisfaction while minimizing use of scarce server resources.

In one implementation, one type of change (step 508) is an undo change. The image processing software 109 can include an undo tool to allow a user can undo previous operations or manipulations that form the current product attributes. In one implementation, the user can invoke the undo tool to reset the product attributes to a last defined state. Alternatively, the user can select from a list of previous states to return to. In another implementation, the undo tool only "un-does" the last operation/change to the product attributes. In another implementation, the undo tool can be used to specify a change to a known state. In one implementation, the undo tool operates on the product attribute information and not on the image data. In this way, the original image data can always be recalled as necessary.

In one implementation, most image processing is made on a proxy image. The proxy image is typically of lower resolution than the original image for faster processing speed. The proxy image can be generated by the image processing software 109 and displayed locally to the user. Processing parameters (e.g., product attributes) associated with changes (operations) applied to an image (or other account data) are saved in a metadata file while the source image (or underlying data) is not changed. In one implementation, the metadata file (i.e., state information) is sent to the server 102 of the online photofinisher along with the original image data. Upon receipt, the original source image can be processed (for viewing or printing) using the processing parameters saved in the metadata file. An example of the processing parameter is the rotation and cropping. One can simply store the rotation angle and cropping location and dimensions.

The user also has the option to choose to use the source image for image processing. For example, if the user wants to carefully preview the detailed image structure, he or she may want to use a full-resolution image.

The system 100 can be implemented so that state information for each image in the image database or storage medium is automatically stored. The state information is "automatically" stored in that the user need not issue an explicit "save" command in order to store such state information. For example, the state information for each image stored on the server 102 can include the current product attributes associated with the image. Default product attributes are initially associated with an image when the server 102 receives the image. These default product attributes are automatically stored on the server 102 as the current product attributes for that image. Then, each time the user changes the product attributes associated with that image, the stored product attributes are updated to reflect such changes. Similar product attribute information can be saved on the client computer each time an image is manipulated on the client computer. The information can be retrieved as part of a synchronization operation or retrieved from local storage (storage medium 110) each time the client computer is accessed.

Figure 6:
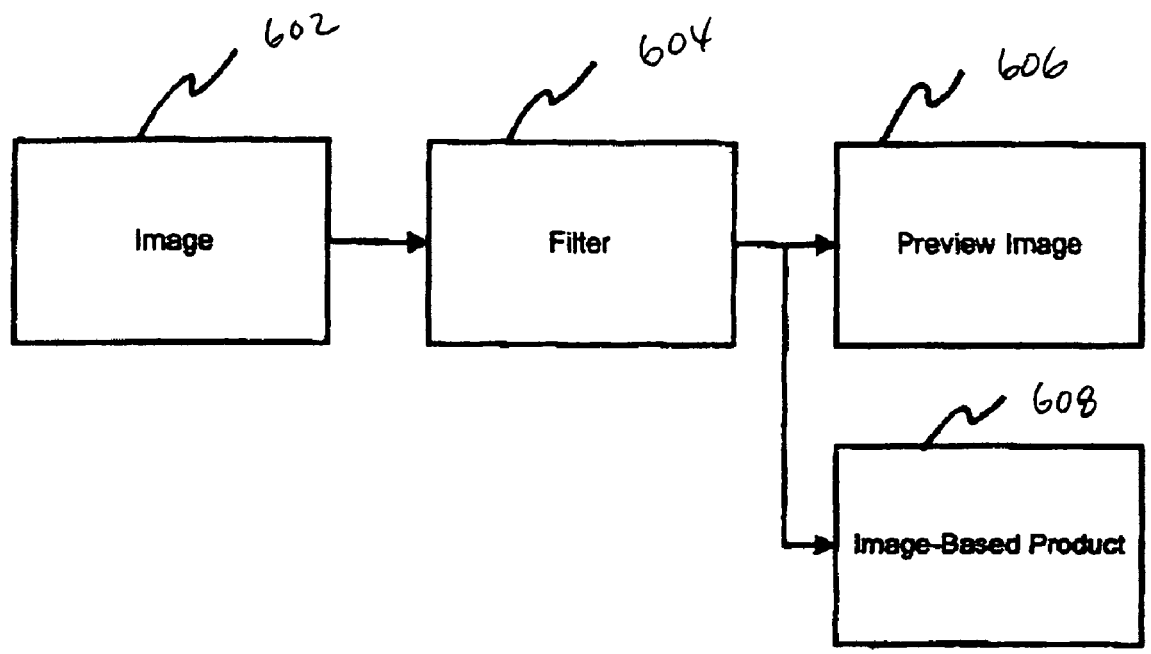
FIG. 6 illustrates an approach for manipulating images.

FIG. 6 illustrates one approach to implementing such a system 100. The stored current product attributes for a given image 602 can include product attributes relating to the rotation of the image, cropping information such as the boundary, shape, and orientation of the selected portion of the image, any processing to be applied to the image, the magnitude of such processing, and print size and orientation (e.g., where the image-based product is an image print). The stored current product attributers are used by a filter 604 that is applied to the image 602 in order to generate a preview image 606. Also, the filter 604 is applied to the image 602 in order to generate an image-based product 608 from the image 602.

Figure 7:
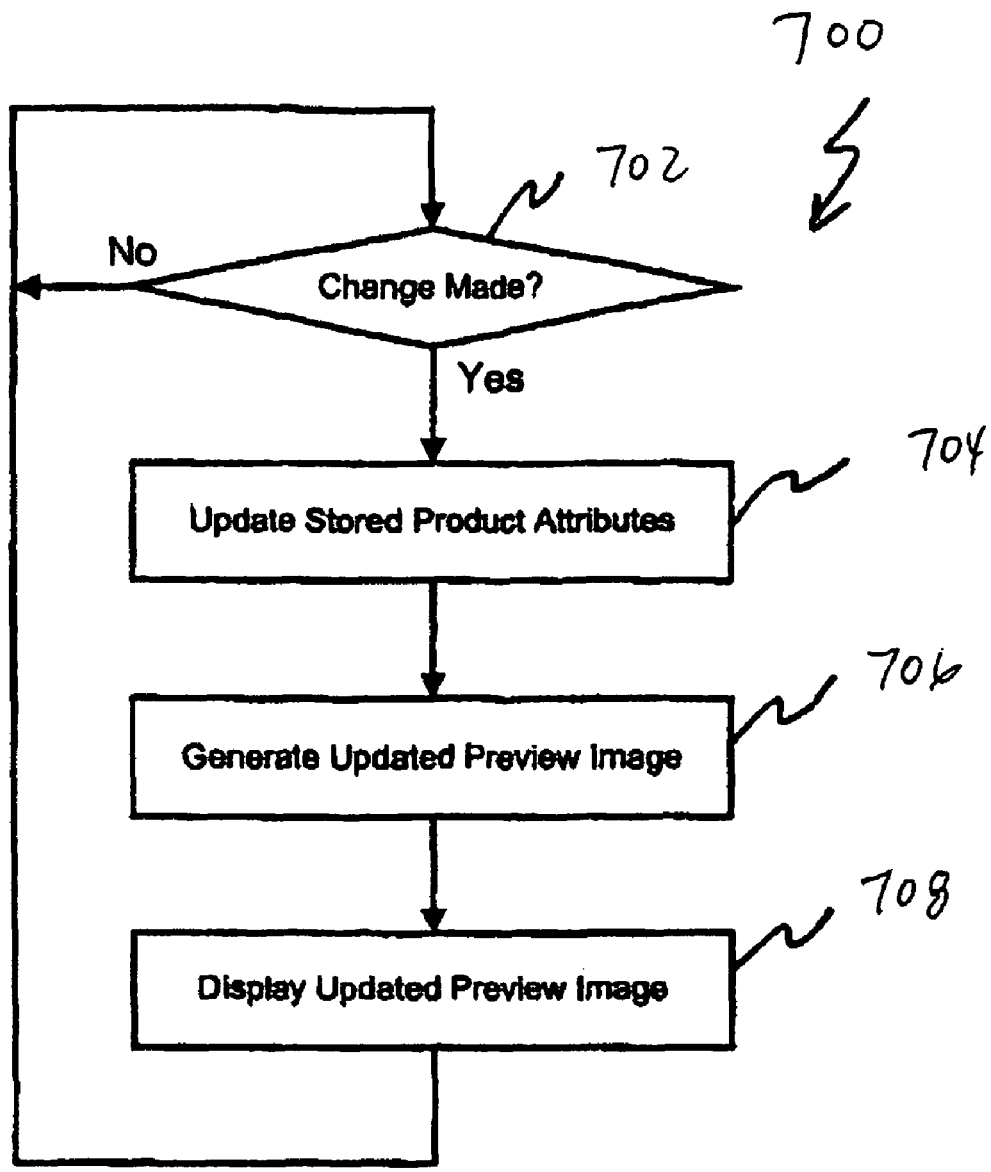
FIG. 7 is a flow diagram of a process for automatically storing state information.

FIG. 7 is a flow diagram of a process 700 for automatically storing state information including the current product attributes associated with an image. When a change is made to a product attribute associated with an image (which is checked in block 702), the stored product attributes for that image are updated (block 704). Then, an updated preview image is generated from the updated state information (block 706). For example, the filter 604 can use the updated state information to generate a preview image with a border having the selected border color. The updated preview image can then be displayed, for example, on the user's client computer 104 (block 708).

In addition to information about the current state of product attributes associated with a given image, the state information can include information about past states of the product attributes for the image. The information about past states of the product attributes can include modification history information that can be used to "undo" changes the user has previously made to the product attributes. Also, this modification history information can be used to allow the user to "redo" any changes that have been undone. Separate modification history information is stored for each image. For example, the user can make changes to product attributes associated with a first image. Then, the user can cease accessing that image and perform some other operation—for example, accessing and changing product attributes associated with a second image and/or disconnecting from the server 102. Subsequently (e.g., several days later), the system 102 can retrieve the modification history information for that image and use that information to allow the user to undo or redo changes made when the user last accessed that image.

Figure 8:
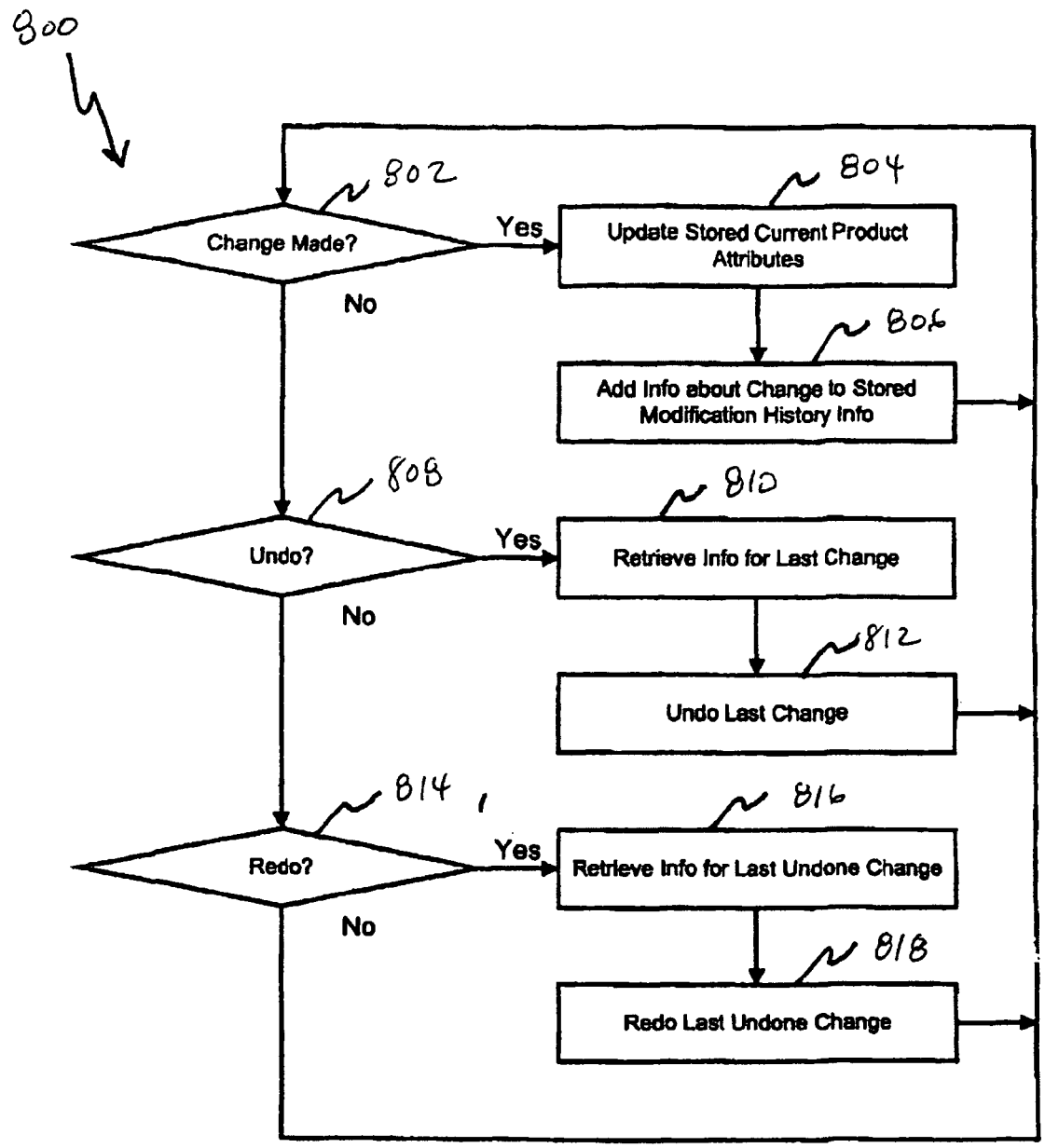
FIG. 8 is a flow diagram of a process for storing and using modification history information.

FIG. 8 is a flow diagram of a process 800 executed at both the client computer 104 and the sever 102 for storing and using modification history information. For each change that is made to the product attributes of an image (which is checked in block 802), the current stored product attributes for that image can be updated (block 804). Also, information that can be used to undo the change is added to the modification history information for that image (block 806). For example, the modification history information can be stored in a stack associated with the image. Each time a change is made to the product attributes of the image, a new record is created and pushed onto the stack. Each record contains information indicating which product attribute was changed, the value of the product attribute before the change was made, and the value of the product attribute after the change was made. The record is pointed at by an undo pointer, which can be used to identify which record in the stack is associated with the last change made to the product attributes. Also, a redo pointer can be provided which points to the record associated with the last change that was undone.

As shown in FIG. 8, if the user subsequently makes another change to the product attributes of the image, a new record is created and pushed onto the stack. For example, if the user changes the border width of the image from 0.1 inches to 0.2 inches, the record contains information indicating that the border width attribute was changed and information indicating that the border width attribute was changed from 0.1 inches to 0.2 inches.

If the user subsequently issues an undo command (which is checked in block 808 as shown in FIG. 8), the server 102 retrieves the modification history for the last change that was made to the product attributes of the image (block 810) and the last change is undone (block 812). For example, if the user issues an undo command (e.g., by clicking on an "undo" button displayed on the client computer 104), the server 102 retrieves the record associated with the last change made to the product attributes for the image, which is pointed to by the undo pointer. The server 102 uses the last change record to set the current product attributes while storing the previous state information (for 1 level of redo operation). A new preview image can then be generated using the updated (undone) product attributes and displayed for the user.

If a user issues a redo command, the modification history information for the last change that was undone is retrieved (block 816) and that change is redone (block 818). A change is "redone" by re-making the change that was previously undone. For example, if the user issues a redo command (e.g., by clicking on a "redo" button displayed on the client computer 104), the server 102 (or client computer 104) retrieves the record associated with the last change that was undone, which is pointed to by the redo pointer. The server 102 uses record pointed to by the redo counter to determine the last undone change. A new preview image can then be generated using the updated product attributes and displayed for the user.

The system including image processing software 109 allows for distributed image editing, reviewing, and correction. As described above, image processing software 109 can be configured to allow a user to invoke such functions such as preview, select, color/tone changes, maintain metadata, crop/rotate, apply borders and effect, insert annotation and backprinting message, login application, upload to the online photofinisher's website, desktop presence, camera to PC image transfer and other image, account or order processes.

For example, order/pricing, verification, and other information destined for the online photofinisher can all be input and stored on the user's computer. Changes to account, order or image data can be passed as part of the synchronization process. When processing orders, a credit can be blocked on the credit account designated by the user when the information is received by the server of the online photofinisher. Charges can be made at the time for shipping of the printed images.

In one implementation, the type of image operations that can be executed on the client computer 104 can depend on the computer type. For example, the image processing software available for use on a palm pilot may be configured to allow only high-level image commands such as image organization, print ordering etc. which do not require detail image visualization or judgment of image quality. In one implementation, the client computer may be included as part of a digital camera. In this implementation, a more limited range of image manipulation operations may be supported due to cost, screen performance or other issues. Alternatively, the client computer may reside in a docking station into which a digital camera can be loaded. The docking station may include a separate computer display or may make use of the digital camera's display for performing various image or account manipulations. In one implementation, the image processing software 109 may be resident on a memory card stored in the digital camera. The digital camera may include a processor for executing the image processing software, or alternatively, the processor may be remotely located (e.g., in a docking station).

In one implementation, image processing software 109 includes one or more printer output profiles associated with a printer at the online photofinisher's site. The printer output profiles can be incorporated as part of the software or be downloaded at the time an order is specified. The printer output profile helps to simulate the effect of an image produced by a particular output device used by the photofinisher service. Output profiles are useful for previewing and proofing the changes the user makes in the images before printing. Different output profiles can be provided for different receivers such as poster print, glossy substrate, canvas, fabric, or for different printing technologies such as digital silver halide, ink jet, laser, thermal dye sublimation. The printer output profile may include printer calibration information.

Image processing software 109 helps the user organize his images in an image metaphor very similar to what he/she views online at the online photofinisher's website. The images can be viewed in thumbnail sizes in an array structure. They can be dragged and dropped into a box that represents the user account at the online photofinisher website. Each image carries information about the use, share, print, and archival history of that particular image stored on the website (i.e., product attributes). Image processing software 109 can be configured to produce an album, slide show, and categories (folders) of the images on the client computer 104.

Image processing software 109 can be configured to organize the user's images that are stored in the client computer or only those stored on the photofinisher's server (website). For the digital images that are only stored on the photofinisher's website, thumbnail images of the images can be created in the synchronization process so that the images can be represented on the client computer. The images may be encrypted on the client computer to protect privacy, especially when the client computer is shared by more than one user.

In one implementation, image processing software 109 includes tools for educating the user about imaging sciences and technologies. For example, a image quality barometer can be provided to the user to visualize the image quality level of digital camera with certain number of image pixels (1M, 2M, 3M pixels), and the images printed at certain dimensions (3.5", 4", 5', 8" etc.). The perceived image quality is also dependent on the application of borders and other effects as produced by the online photofinishing service.

In one implementation, image processing software 109 and image manipulation software 117 allow users to create personal templates that define a particular set or chain of image processing operations often used by a user. The personal template can be used again by the same user and stored in either storage medium 110 or image database 114.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

Figure 9:
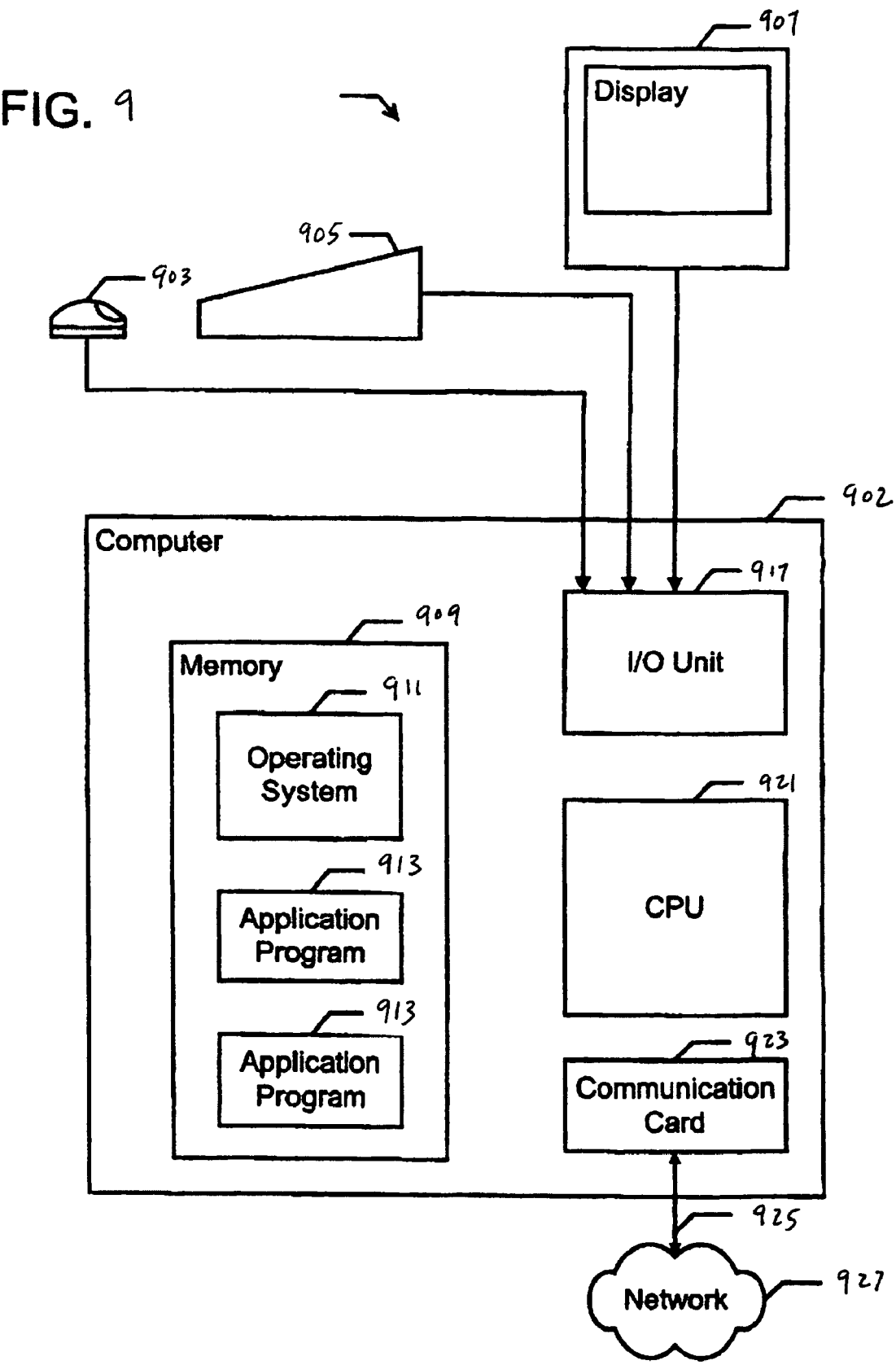
FIG. 9 is a block diagram of a computer system.

An example of one such type of computer is shown in FIG. 9, which shows a block diagram of a computer system 900 suitable for implementing or performing the apparatus or methods of the invention. The computer system 900 illustrated in FIG. 9 represents a typical hardware setup for executing software that allows a user to perform tasks such as communicating with other computer users, accessing various computer resources, and viewing, creating, or otherwise manipulating electronic content—that is, any combination of text, images, movies, music or other sounds, animations, 3D virtual worlds, and links to other objects. The system includes various input/output (I/O) devices (mouse 903, keyboard 905, and display 907) and a general purpose computer 902 having a central processor unit (CPU) 921, an I/O unit 917 and a memory 909 that stores data and various programs such as an operating system 911, and one or more application programs 913. The computer system 900 also typically includes some sort of communications card or device 923 (e.g., a modem or network adapter) for exchanging data with a network 927 via a communications link 925 (e.g., a telephone line).

A number of implementations of the invention have been described. Nevertheless, it will be understood that various modifications may be made without departing from the spirit and scope of the invention. For example, the operations of the processes and methods described here can be performed in a different order and still achieve desirable results. Also, the processes, methods, and systems described here can be used to change a variety of product attributes. Accordingly, other implementations are within the scope of the following claims.

What is claimed is:

1. A method for manipulating a digital image, comprising:
    identifying an image associated with a user on a local client computer;
    defining a personal template that describes a specific configuration of one or more parameters that describe manipulations to be applied to at least one image associated with the same user, wherein the personal template defines a particular set or chain of image processing operations associated with the user;
    sending the image from the local client computer to a remote server;
    storing the personal template in association with the image on the local client computer and the remote server;
    modifying one or more parameters in the personal template, by a computer processor in the local client computer or a remote processor in communication with the remote server, without manipulating the image itself; and
    synchronizing the personal templates on the local client computer and the remote server.

2. The method of claim 1, wherein the one or more parameters include an identifier for the personal template.

3. The method of claim 1, where the step of synchronizing comprises:
    checking for conflicts between the personal templates stored on the local client computer and the remote server; and
    upon detecting a conflict, alerting the user to the conflict.

4. The method of claim 1, further comprising:
    receiving, from the user, a selection regarding adopting one of the personal templates stored on the local client computer and the remote sever; and
    synchronizing the personal templates stored on the local client computer and the remote sever according to selection.

5. The method of claim 1, further comprising storing two different states of the personal templates at each of the local client computer and the remote server, one state containing a different set of conflicting parameters.

6. The method of claim 1, further comprising:
    manipulating a proxy image that is a lower resolution version of the image in accordance to the one or more modified parameters in the personal template; and
    displaying the manipulated proxy image.

7. The method of claim 1, wherein the one or more parameters include annotation to be inserted in the image.

8. The method of claim 7, further comprising:
    inserting the annotation to a proxy image that is a lower resolution version of the image; and
    displaying the proxy image containing the annotation.

9. The method of claim 1, further comprising:
    capturing a history of states of the one or more parameters; and
    selecting one of the history of states without traversing back through each intermediary state in the history.

10. The method of claim 1, wherein the local client computer is selected from the group consisting of a portable digital assistant, a portable computer, a kiosk, a digital camera, and a docking station.

11. The method of claim 1, wherein the one or more parameters include print parameters for printing an image-based product incorporating the image.

12. The method of claim 1, wherein the print parameters include print calibration parameters for the printer.

13. The method of claim 1, wherein the print parameters include information to be printed on the back of an image print based on the image.

14. A method for manipulating a digital image, comprising:
identifying an image for processing at a local client computer;
sending the image to a remote server;
manipulating either locally or remotely parameters associated with the image without modifying the image itself;
synchronizing the local client computer and the remote server including updating metadata for one of the local client computer and the remote server using metadata of the other;
checking for conflicts between metadata stored at the local client computer and the remote server; and
storing two different states of the metadata at each of the local client computer and the remote server, one for each of the conflicting parameters.

15. The method of claim 14, further comprising:
receiving a selection between the two different states in the conflict; and
synchronizing the local client computer and the remote sever in accordance with the selection.

16. The method of claim 14, further comprising: upon detecting a conflict, alerting the user about the conflict.

17. The method of claim 14, wherein the synchronizing step includes updating local client software for manipulating the image.

18. The method of claim 14, wherein the manipulating step includes manipulating a proxy image associated with the image, wherein the proxy image is a lower resolution image than the image.

19. The method of claim 18, wherein the step of manipulating the proxy image includes creating metadata describing the manipulations to the image, applying the metadata to the proxy image and displaying the modified proxy image.

20. The method of claim 14, further comprising:
selecting between the image and a proxy image, the proxy image being a lower resolution copy of the original image;
modifying the selected image in accordance with the manipulation parameters; and
displaying the modified selected image.

21. The method of claim 14, further comprising storing the metadata as a file associated with the image at each of the local client computer and the remote server.

22. The method of claim 14, wherein the metadata includes rotation information, cropping information, or user interface state information.

23. A method for manipulating a digital image, comprising:
identifying an image for processing at a local client computer;
sending the image to a remote server;
manipulating either locally or remotely parameters associated with the image without modifying the image itself;
capturing state information defining a state of the manipulations at a predefined time and selecting a previous state at the request of the user; and
synchronizing the local client computer and the remote server including updating metadata for one of the local client computer and the remote server using metadata of the other.

24. The method of claim 23, further comprising capturing a history of the state information and selecting any of the previous states without traversing back through each intermediary state in the history.

25. The method of claim 23, wherein the image parameters include the state of the user interface.

* * * * *